United States Patent
Hall et al.

(10) Patent No.: US 6,827,897 B2
(45) Date of Patent: Dec. 7, 2004

(54) REDUCTION OF FRICTION EFFECT BETWEEN POLY (ETHYLENE TEREPHTHALATE) PREFORMS AND BOTTLES

(75) Inventors: Graham H. Hall, Cleveland (GB); Michael A. Neal, Middlesbrough (GB); Stephen D. Jenkins, Cleveland (GB); Junaid A. Siddiqui, Richmond, VA (US)

(73) Assignee: Invista North America S.a.r.L., Wilmington, DE (US)

( * ) Notice: Subject to any disclaimer, the term of this patent is extended or adjusted under 35 U.S.C. 154(b) by 667 days.

(21) Appl. No.: 09/818,334

(22) Filed: Mar. 27, 2001

(65) Prior Publication Data

US 2002/0009564 A1 Jan. 24, 2002

Related U.S. Application Data

(60) Provisional application No. 60/192,272, filed on Mar. 27, 2000.

(51) Int. Cl.⁷ .................. B29C 49/06; B29C 49/08
(52) U.S. Cl. .................. 264/523; 264/527; 264/211; 264/213; 264/300; 264/328.17
(58) Field of Search ................ 264/523, 527, 264/211, 213, 300, 328.17

(56) References Cited

U.S. PATENT DOCUMENTS

| | | | |
|---|---|---|---|
| 4,837,115 A | * | 6/1989 | Igarashi et al. .......... 428/36.92 |
| 5,256,489 A | | 10/1993 | Maringer et al. |
| 5,610,222 A | * | 3/1997 | Mills et al. .................. 524/493 |
| 5,972,496 A | | 10/1999 | Crane et al. |
| 6,596,385 B1 | * | 7/2003 | Perez .......................... 428/213 |

FOREIGN PATENT DOCUMENTS

| | | |
|---|---|---|
| EP | 0937743 | 8/1999 |
| GB | 2188586 | 10/1987 |
| WO | WO 99-20343 | 10/1999 |

OTHER PUBLICATIONS

Chem Abstractsxz, vol. 131, No. 10, Sep. 6, 1999, Abstract No. 130699; Polyolefin Resin Compositions and Heat-–Shrinkable Packaging Films.

PAJ vol. 2000, No. 10, Nov. 17, 2000, Toray Ind. INc.

PAJ vol. 015, No. 236 Jun. 18, 1991, Sumitomo Wiring System, Ltd.

International Search Report for PCT/US01/09704, dated Oct. 4, 2001.

* cited by examiner

*Primary Examiner*—Suzanne E. McDowell
(74) *Attorney, Agent, or Firm*—Charles E. Krukiel

(57) ABSTRACT

An additive system for polyester polymers comprising an effective amount of (i) a fatty acid amide selected from the group consisting of oleyl palmitamide, ethylene bis stearamide, ethylene bis oleomide, and stearyl erucamide; (ii) a partially or fully calcined porous poly (methylsilsequioxane); and (iii) a stabilizer comprising a primary and a secondary antioxidant.

6 Claims, 1 Drawing Sheet

Figure 1:
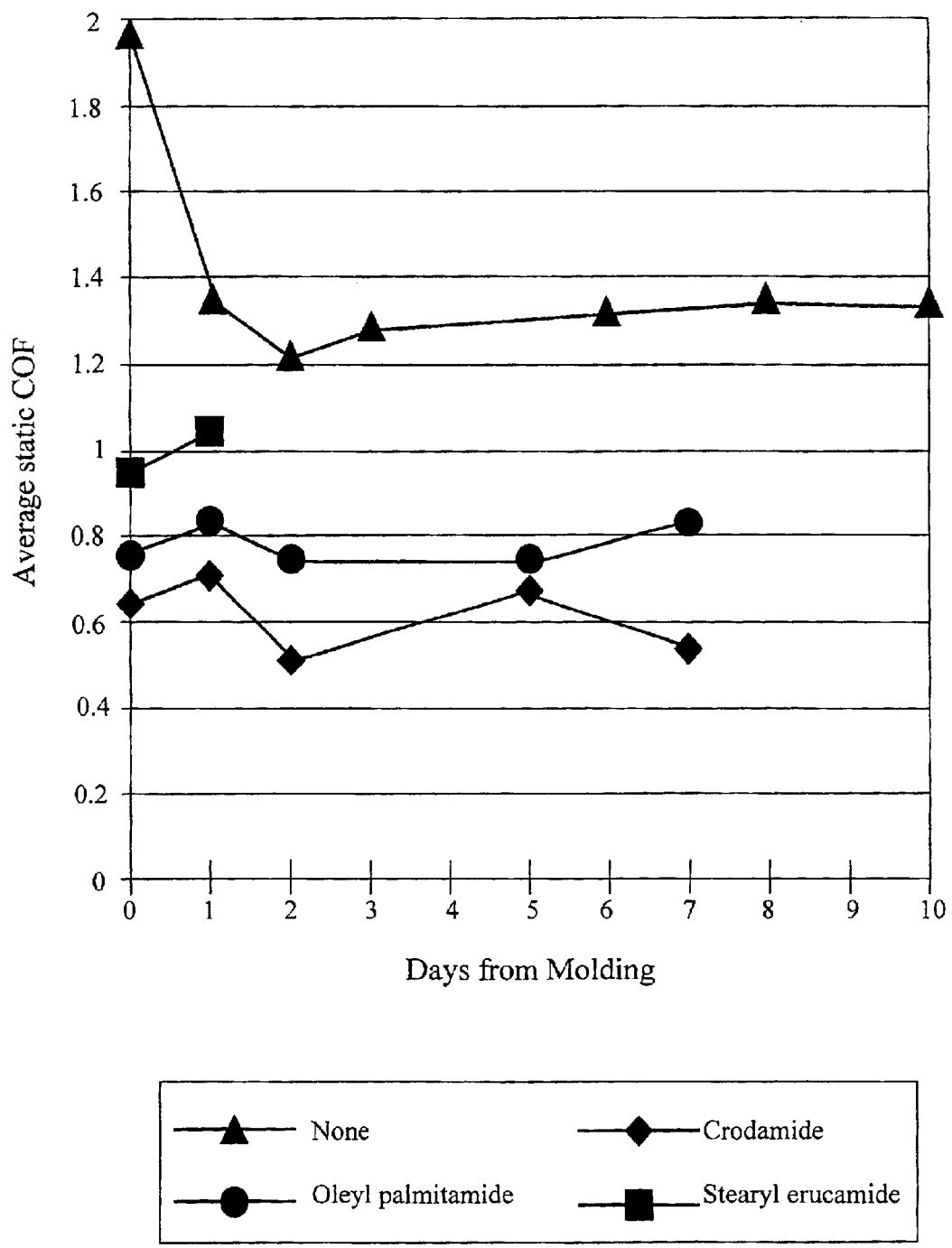

REDUCTION OF FRICTION EFFECT BETWEEN POLY (ETHYLENE TEREPHTHALATE) PREFORMS AND BOTTLES

CROSS REFERENCE TO RELATED APPLICATION

This application claims the benefit of U.S. Provisional Application No. 60/192,272 filed Mar. 27 2000.

BACKGROUND OF THE INVENTION

The present invention relates to a unique additive system for reducing static friction, i.e., "stiction" in molded polyester articles and films. More particularly, the present invention relates to a method for producing low haze, transparent poly(ethylene terepthalate)(PET) preforms, bottles, sheet and thermoformed articles which contain such an additive system and which exhibit improved slip performance. The additive system comprises an effective amount of (i) a fatty acid amide selected from the group consisting of oleyl palmitamide, ethylene bis stearamide, ethylene bis oleomide, and stearyl erucamide; (ii) a partially or fully calcined porous poly(methylsilsequioxane); and (iii) a primary and a secondary antioxidant.

PET homopolymer and copolymers are widely used in rigid packaging applications, but particularly for carbonated soft drinks (CSD) as they can form strong, lightweight bottles with a satisfactory barrier to gas transmission, primarily oxygen and $CO_2$. In the production of such bottles, PET is first moulded into small somewhat condensed shapes known as preforms, which are relatively thick-walled test tubes with a threaded neck finish, to facilitate appropriate closure. The preforms can then be blown into the final bottle shape (a process known as injection stretch blow molding, or ISBM), by being heated under infrared radiation, placed immediately into a mould, and injected with a sudden blast of air. The air blast expands the preform into the shape of the mould. One of the problems encountered in producing preforms and bottles from PET, however, is that these articles exhibit a mutual sticking effect, which can make high speed handling difficult on modern blowing/conveying machines.

The effect of this sticking phenomenon with preforms packed into a box is a lower than optimum packing density and correspondingly higher transportation cost per preform. The effect further manifests itself when unloading these boxes onto a blowing line, where the preforms tend not to flow smoothly into the automatic unscramblers and other register machinery. This can then result in less than optimum preform feed rates to the blowing machine. Bottles sticking together reduce conveying efficiency and hence overall filling speed on a filling line, and create further problems during bottle palletising/depalletising. In sheet manufacture sticking effects create problems in sheet unrolling and cutting after storage, as well as with de-nesting of thermoformed articles.

The exact origin of the observed sticking effect has not been identified, but it may result from static electricity, intermolecular attraction and/or surface roughness.

SUMMARY OF THE INVENTION

The present invention resides in the discovery of a unique additive system for polyester polymers which improves the handling performance of articles and sheet products produced from the polymers by reducing the tendency of the articles and sheet products to adhere or stick. The additive system comprises an effective amount of (i) a fatty acid amide selected from the group consisting of oleyl palmitamide, ethylene bis stearamide, ethylene bis oleomide, and stearyl erucamide; (ii) a partially or fully calcined porous poly(methylsilsequioxane); and (iii) a primary and a secondary antioxidant in a ratio of 1:4, respectively.

According to another aspect, the present invention is a method for reducing the sticking effect, i.e., the static friction effect, or "stiction", between molded articles of PET homo- and co-polymers comprising incorporating into the polymer, at the processing stage, pre-compounded or included through a masterbatch, an effective amount of (i) a fatty acid amide selected from the group consisting of oleyl palmitamide, ethylene bis stearamide, ethylene bis oleomide, and stearyl erucamide; (ii) a partially or fully calcined porous poly(methylsilsequioxane); and (iii) a primary and a secondary antioxidant in a ratio of 1:4, respectively.

According to yet another aspect, the present invention is a method for producing a PET molded article, particularly bottles and other containers for carbonated soft drinks and spring water, having a reduced sticking effect which comprises the steps (1) incorporating into the polymer an effective amount of an additive system comprising a fatty acid amide selected from the group consisting of oleyl palmitamide, ethylene bis stearamide, ethylene bis oleomide, and stearyl erucamide; (ii) a partially or fully calcined porous poly(methylsilsequioxane); and (iii) a primary and a secondary antioxidant in a ratio of 1:4 at any point before molding, and then (2) molding the polymer.

The additive system imparts unexpectedly improved handling properties to transparent preforms, bottles, sheet and thermoformed articles produced from PET resin without affecting the resins's ability to consistently meet strict specifications with respect to color, taste, odor, feel and toxicity in finished bottles.

BRIEF DESCRIPTION OF THE DRAWING(S)

FIG. 1 is a graphical representation of the slip-producing effect of certain fatty acid amides in PET.

DETAILED DESCRIPTION OF THE INVENTION

The present invention is directed to a new and useful additive system and to a method for reducing the sticking effect between PET molded articles, containers and the like, by incorporating into the PET homo- or co-polymer a unique combination of ingredients which operate to produce a desired level of "slip" while maintaining a high level of clarity and low color in use.

The term "PET" as used herein in describing the invention includes all polymeric and copolymeric forms of poly (ethyleneterephthalate). Satisfactory copolymers include those polyester copolymers which are suitable for both single and two-stage processing into various containers. The copolymer used in the examples which follow to illustrate the invention is Melinar® Laser$^+$ brand PET resin (designated for convenience herein as either Laser$^+$ or L$^+$, and available from E. I. du Pont de Nemours and Company, Wilmington, Del.), which is formulated especially for carbonated soft drink containers, and custom and mineral water containers. In order to be acceptable for carbonated soft drink containers and the like, the PET polymer must meet certain strict specifications with respect to color (i.e., low haze), taste, odor, feel and toxicity. Any additive or additive system, therefore, designated for incorporation into the PET polymer for any purpose must not alter these strict specifications.

The fatty acid amides within the scope of the invention were shown to not only reduce the sticking effect of molded preforms and bottles, but also to have negligible effect on color, taste, odor, feel and toxicity in the presence of a stabilizer. Those fatty acid amides are selected from the group consisting of ethylene bis stearamide, ethylene bis oleomide, oleyl palmitamide, stearyl erucamide and mixtures thereof. The fatty acid amides are incorporated into the PET in effective slip-producing amounts of from 0.01% to 20.0% by weight. All of the above fatty acid amides (available from Croda Chemicals of Cowick Hall, Snaith, Goole, East Yorkshire, DN14 9AA, England) are pelletized waxy solids.

According to one method for carrying out the invention, the ethylene bis stearamide, ethylene bis oleomide, oleyl palmitamide, stearyl erucamide and/or mixtures thereof can be added to the PET polymer during polycondensation, i.e., after primary esterification, but before the polymer is extruded and pelletized. The concentration of fatty acid amide in the polymer will be the same as the level seen in the finished PET product.

In yet another means for carrying out the invention, the fatty acid amide at a concentration of from 5 to 30% fatty acid amide by weight can be melt blended directly with the PET, or dry blended and then fed into a melt stream via calibrated hopper feeders, to yield a more concentrated masterbatch.

It is known that silica and other similar fillers, when added to PET polymers, tend to increase haze in the blown bottles, and haze is particularly detrimental from an aesthetic standpoint. However, the invention resides in the discovery that partially or fully calcined porous poly(methylsilsequioxane) can be incorporated into the PET as part of the additive system and thereby reduce surface friction without producing objectionable levels of haze or other detrimental effects in the molded containers. Preferably, the partially or fully calcined porous poly(methylsilsequioxane) is incorporated into the PET in effective slip-promoting amounts of from 0.001% to 10% by weight.

Partially or fully calcined porous polymethylsilsesquioxane for use according to the invention is prepared from Tospearl, which is commercially available from Toshiba Silicone, Japan.

Silicone particles comprise a three-dimensional polymer chain of the formula (I):

$$R_xSiO_{2-(x/2)} \quad (I)$$

in which x is a positive number greater than or equal to 1, preferably 1 to 1.9, more preferably 1 to 1.5, and most preferably 1 to 1.2; and R is an organic group, such as an aliphatic hydrocarbon group, e.g., methyl, ethyl, or butyl, or an aromatic hydrocarbon, e.g., phenyl, an unsaturated group, e.g., vinyl, or a mixture of two or more of these groups.

R is preferably a hydrocarbon group having 1 to 8, but preferably 1 to 5, carbon atoms, and particularly methyl. Particularly preferred silicon resin particles comprise methyl sesquioxane Silicone particles have a cross-linked network of siloxane linkages, comprising a mixture of the following structures:

RSi(O—)$_3$ and (R)$_2$Si(O—)$_2$ in which R is as defined above. Suitable silicone particles are commercially available from Toshiba Silicone Co., Ltd., Tokyo, Japan, under the name of "Tospearl" silicone resin particles. These particles have a three-dimensional network structure in which each silicone atom is bonded to one methyl group.

Calcining eliminates some or all of the R group, reducing the value of x. If all of the organic group is eliminated (i.e., x is 0), the particle is converted to silica (SiO$_2$).

To form the calcined silicone particles for use according to the invention, the particles are calcined at about 300° C. to about 400° C. for about 30 min to about 3 hr, preferably at about 300° C. for about 45 min. Calcining may be carried out in air or in a suitable inert atmosphere, such as nitrogen. Elimination of some or all of the organic material during calcination reduces the weight of the particle. The particles typically lose from about 3% up to about 5%, but typically about 2% to about 4%, of their original weight when calcined under these conditions.

The porosity of the calcined silicone particles has been observed to enhance the adhesion of the particles to the polymer. Because the calcined silicone particles are softer (i.e., having a moh hardness of 3) than glass particles (i.e., moh hardness of 6), they are less prone to scratch the bottles during transport.

An analysis of calcined Tospearl particles was carried out as described below.

Tospearl Analysis

Volume distributed median particle diameter, and particle size distribution ratios $D_{25}/D_{75}$ and $D_{10}/D_{90}$ were measured using Microtrac.

BET specific surface area was measured by multi-point nitrogen adsorption using a Micromeritics ASAP 2400. Relative pressures between 0.05 and 0.21 were used, and the outgassing conditions were 1 hour at 140° C. with nitrogen purge (1 to 2 litres/hour).

Skeletal density was measured by helium pycnonmetry using a Micromeritics Accupyc 1330.

The ratio of methyl groups to silicon atoms was measured by $^{29}$Si magic angle spinning NMR spectroscopy. The spectrum was acquired on a Bruker MSL200 NMR spectrometer operating at a frequency of 39.73 MHz for $^{29}$Si. The magic angle was set using KBr and the spinning speed was 5050 Hz. The NMR free induction decay consisting of 2K complex data points was acquired using the single pulse excitation pulse sequence together with high power $^1$H decoupling where the $^1$H decoupling field was of the order of 70 kHz. The spectral width was 20 kHz, $^{29}$Si pulse length 5.5 μs (90°) and recycle delay 60 s. 1000 transients were accumulated. Data processing was carried out with the Bruker LB parameter equal to 60 Hz, followed by Fourier transformation, phasing, baseline correction and integration using the Bruker software EP-I routine.

Calcining

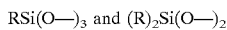

Silicone resin particles (Tospearl, supplied by Toshiba Silicone Co Ltd., Japan) were calcined by heating in an oven at approximately 300° C. for approximately 4 hours in an atmosphere of air in order to produce filler particles for use in the present invention. The resultant calcined silicone resin particles exhibited the following characteristics (i) volume distributed median particle diameter=2–3 micron (ii) particle size distribution ration $D_{25}/D_{75}$=0.6–0.9 micron (iii) particle size distribution ration $D_{10}/D_{90}$=1.1 micron (iv) BET specific surface area 48–60 micron m$^2$/g (v) skeletal density=2.06 g/cm$^3$ (vi) ratio of methyl groups to silicon atoms=0.2

The presence of fatty acid amides in PET can present problems during processing at elevated temperatures due to thermal-oxidative degradation. This can be overcome according to the invention through the use of selected primary and secondary antioxidants as stabilizers. Primary antioxidants are selected to interrupt the propagation of radicals associated with thermal-oxidative degradation and of the general types of hindered phenols and aryl amines.

Hindered phenols and multifunctional hindered phenols are preferred primary stabilizers.

Secondary anitoxidants are intended to stop degradation reaction initiation by removal of hydroperoxides, and they are generally selected from phosphorous or sulphur-containing compounds. Phosphites or phosphite esters, and particularly aryl phosphite esters, are preferred for use according to the invention.

Primary and secondary antioxidants employed in combination according to the invention are more effective than when either is used independently. The use of these materials is established here for the particular system incorporating the "stiction" additives claimed. The specific combination described herein (1 part hindered phenol:4 parts phosphite ester) was found to provide superior color compensation. The combination is incorporated during preparation of the masterbatch. Then, all of the additives can conveniently be fed simultaneously by feeding the masterbatch via calibrated feeders into the PET melt stream. The concentration of primary antioxidant can be from 0.14 to 28% by weight, and the concentration of secondary antioxidant can range from 0.04 to 8.0% by weight.

In a preferred embodiment the primary stabiliser, i.e., antioxidant, is tetrakis[methylene(3,5-ditert.butyl-4-hydroxy-hydrocinnamate)] methane, which is available commercially as Irganox 1010 (Ciba, Basel, Switzerland), and the secondary stabilizer is (2,4-ditert.butylphenyl) phosphite, which is availavble commercially as Irgaphos 168 (Ciba Speciality Chemical, Ltd., Basel).

EXAMPLES

Measurements were conducted to identify candidates for use as anti-stiction additives in bottle preforms and to determine at what concentration an additive would produce an optimum anti-friction, or slip-producing, effect.

A preform stiction apparatus was designed to provide a reproducible measurement of the adhesive force between PET preforms. This can identify differences between preforms of different compositions. In Laser+ preforms a stearyl erucamide bead additive was found to provide the minimum level of adhesion.

Test Procedure

A range of Laser+ PET formulations were injection moulded into parison tubes, or preforms. The moulding was carried out at 260° C. under identical injection moulding conditions. The formulations comprised representative samples with different additives selected from oleyl palmitamide and stearyl erucamide at a concentration of 0.1% by wt and one control formulation (Laser+ with no additive). The preform samples were moulded using a Negri Bossi NB90 molding machine. In addition, an extra batch of Laser+ control preforms were moulded using a Husky XL 160 molding machine for comparison.

Each preform sample was allocated an identification number. The start and finish time/date of moulding was recorded allowing the time of moulding of each preform to be estimated. The preforms were wrapped in aluminium foil and handled as little as possible at all stages. In order to control the environmental effects and to avoid surface contamination, the injection moulded preforms were stored in temperature and humidity controlled laboratory conditions within 15 minutes, and the measurements were recorded in the controlled environment.

The model of adhesive friction used for the evaluation was as follows:

Adhesive shear force=interfacial strength per unit area×real area of contact

Interfacial shear strength per unit area is a good indication of the strength of the adhesion, and therefore the stiction, in a surface-to-surface contact. The adhesive shear force makes up part of the measured friction force, and deformation also makes a contribution. The real area of contact was generally approximated by using:

real area of contact=normal force/hardness.

According to this approximation, the adhesive coefficient of friction will be independent of both contact geometry and normal force. However, in the case of PET bottles, the combination of high attractive forces across the contact, low hardness and easy deformation of the wall may lead to greater true areas of contact those predicted and therefore greater coefficients of friction. So to get results that reflect the value of the interfacial strength the contact was kept consistent from test to test and sample to sample.

A crossed cylinder apparatus gave a good reproducible contact geometry (similar to sphere on flat). The preforms had a relatively small diameter and were quite stiff, deforming only slightly with the normal load, giving a small contact spot and shear forces of a magnitude that were easily measurable.

Two cylindrical preforms were mounted at 90° to one another and pressed together with a known force using a solenoid. This gave a circular contact point similar to that observed in a sphere against flat arrangement. The contact area will be small as the preform walls are rigid and the preform diameter is small. The configuration allows the parallel walled section of the preforms to be brought into direct contact with one another. This geometry is representative of the conditions under which stiction is observed in practice. An Instron test frame then controls the movement of one preform across the other at a fixed load and rate, while friction force, normal force and position can be simultaneously recorded.

Sample preforms were loaded together with a force of 10 N. This load was selected to optimize the accuracy of the technique. A 10 N force can be applied easily and with accuracy without the need for a sensitive, delicate and/or expensive load cell to monitor the normal force. This normal force gives a magnitude of friction force which can be read accurately with standard 100 N Instron load cells. A higher force has been adopted in these tests than in normal applications because the adhesive force is related to the normal force only through its influence on the contact area (especially in the case of static friction, where frictional heating is not a factor). Thus, the relatively high magnitude of the normal force makes testing easier and more accurate without rendering the data inapplicable to the application. The normal force was applied for one minute before starting each experiment. Contacts are known to change with time, particularly in polymers where viscoelastic effects can be significant, and so a constant loading time was a prerequisite. The sliding speed employed was 200 mm/min, and the traverse length was 20 mm (all within the parallel wall range of the preform samples). Experiments were carried out over five to ten days following moulding, and repeat tests were carried out at each time point, using a minimum of three pairs of preforms tested for statistical significance. Experiments were carried out over five to ten days following moulding also because stiction may well be influenced by time dependent phenomena, such as, for example, migration of low molecular weight material or additives to the surface.

Static coefficient friction is regarded as being a direct measurement of stiction since it is a measure of the adhesion between the preforms. Stiction can be said to have occurred when the static coefficient of friction has a greater value than the dynamic coefficient of friction. The results are shown graphically in FIG. 1, from which it can be seen that preforms which included a fatty acid amide exhibited improved slip properties over the control, and stearyl erucamide exhibited the best slip performance.

Additional data obtained from subsequent trials is shown below in Table 1.

TABLE 1

Test A Results

| Sample ID | Static | | Test B Results for PET Film | |
|---|---|---|---|---|
| | Average COF | Dynamic Average COF | Static Average COF | Dynamic Average COF |
| L⁺Control | 1.314 | 0.877 | 3.646 | 0.9116 |
| L⁺0.1% ER* | 0.564 | 0.416 | 1.315 | 0.407 |
| L⁺0.2% ER* | 0.602 | 0.458 | 0.2416 | 0.473 |

*ER = stearyl erucamide

Additional tests were conducted on unoriented PET cast sheet using an Instron slip instrument to determine slip enhancement obtained from a combination of stearyl erucamide and Tospearl. COF values can be seen in Table 2.

TABLE 2

| | Static Friction | Dynamic-Friction |
|---|---|---|
| Laser⁺(control) | 5.14 | 1.75 |
| Laser⁺ + 0.1% ER* + 30 ppm Tospearl | 0.50 | 0.40 |
| Laser⁺ + 0.2% ER* + 8 ppm Tospearl | 0.65 | 0.40 |
| Laser⁺ + 8 ppm Tospearl | 0.65 | 0.43 |

*ER = stearyl erucamide

The fatty acid amide and Tospearl can be added to the polymer either during polycondensation or during direct esterification. However, fatty acid amides, as discussed above, are not thermally stable at typical PET processing or drying conditions. The presence of a fatty acide amide, such as stearyl erucamide, in PET can produce a slightly more green (increase in minus b*), and yellow (more positive b*) color in the polymer and in molded articles produced from the polymer. Thus, the invention includes selection of a compatible thermal stabilizer to complete the additive system. As described above, a primary and a secondary antioxidant are employed in combination as a stabilizer package according to the invention, and this results in more effective color control than when either is used independently. The specific and preferred combination is 1 part hindered phenol:4 parts phosphite ester. The combination is incorporated during preparation of the masterbatch. Then, all of the additives can conveniently be fed simultaneously by feeding the masterbatch via calibrated feeders into the PET melt stream. The concentration of primary antioxidant can be from 0.14 to 28% by weight, and the concentration of secondary antioxidant can range from 0.04 to 8.0% by weight.

Color

Tristimulus colour measurement was carried out by using the colorgard system and tristimulus calorimeter whereby colour is expressed as L*, a* and b*. L* is the lightness variable, and a* and b* are the rectangular colour co-ordinates. Positive values of a* signify redness, negative values greenness, and positive values of b* signify yellowness, negative values blueness.

Polymer test samples, i.e., batches, were prepared which contained 0.2% by wt stearyl erucamide (ER) and 30 ppm Tospearl along with concentrations of the stabilizers shown in Table 3.

TABLE 3

Sample Identification

| Sample Number | Wt % Irgafos 168 | Wt % Irganox 1010 |
|---|---|---|
| 1 | 0.28 | 0.08 |
| 2 | 0.08 | 0.28 |
| 3 | 0.16 | 0.16 |
| 4 | 0.14 | 0.04 |
| 5 | 0.21 | 0.06 |
| 6 | 0.245 | 0.07 |
| 7 | Nil | Nil |
| Laser⁺ Control Batch | | |
| 8 | Nil | Nil |
| 0.2% ER¹ & Tospearl | | |

Plaques were prepared from each of the sample polymers and color measurements were obtained. The results shown in Table 4. Plaque colour measurements which highlight the effect of fatty acid amides are shown in Table 5.

TABLE 4

4 mm Plaque Colour from polymer chip samples dried @ 175° C. for 5 hours

| | L* | a* | b* | YIE | Haze |
|---|---|---|---|---|---|
| Sample 1 | 73.90 | −0.30 | 5.82 | 10.86 | 16.2 |
| Sample 2 | 73.22 | −0.66 | 7.40 | 13.76 | 23.2 |
| Sample 3 | 74.87 | −0.60 | 6.83 | 12.51 | 17.9 |
| Sample 4 | 75.23 | −0.22 | 6.23 | 11.41 | 16.3 |
| Sample 5 | 74.48 | −0.40 | 5.91 | 10.94 | 16.2 |
| Sample 6 | 74.46 | −0.46 | 6.74 | 12.39 | 18.2 |
| Sample 7 | 73.63 | 0.24 | 3.24 | 6.14 | 11.4 |
| Sample 8 | 71.52 | −0.51 | 9.91 | 18.44 | 18.8 |

TABLE 5

Plaque Colour Measurements Highlighting The Effect of Fatty Acid Amides.

| | L* | a* | b* | YIE | Haze | Si Content |
|---|---|---|---|---|---|---|
| Virgin L⁺ - Not compounded through extruder | 77.60 | −0.39 | 3.56 | 7.78 | 10.5 | 0 |
| L⁺ Control - Compounded through extruder | 78.99 | −0.27 | 4.03 | 8.81 | 11.2 | 0 |
| No ER¹ + 168² + 1010³ + Tospearl | 78.64 | −0.33 | 4.09 | 8.92 | 17.6 | 11 ppm |
| 0.2% ER¹ + 168² + 1010³ + 40 ppm Tospearl | 80.62 | −0.86 | 6.3 | 12.94 | 12.9 | 10 ppm |
| Oleyl Palmitamide + 168² + 1010³ + Tospearl | 79.51 | −0.78 | 5.81 | 12.11 | 11.8 | 8 ppm |

¹ER = stearyl erucamide @ 0.2 wt %
²Irgafos 168 @ 0.28 wt %
³Irganox 1010 @ 0.08 wt %

Additional color measurements are shown in Table 6 wherein 0.28 wt % 168², 0.08 wt % 1010³ and 30 ppm Tospearl was added to each polymer sample unless stated otherwise.

TABLE 6

Plaque Colour Measurements Highlighting The Effect of Fatty Acid Amide Loading

|  | L* | a* | b* | YIE | Haze | Si Content |
|---|---|---|---|---|---|---|
| Virgin L+ - Not compounded through extruder | 77.60 | −0.39 | 3.56 | 7.78 | 10.5 | 0 |
| L+ Control - Compounded through extruder | 78.99 | −0.27 | 4.03 | 8.81 | 11.2 | 0 |
| No $ER^1$ + $168^2$ + $1010^3$ + Tospearl | 78.64 | −0.33 | 4.09 | 8.92 | 17.6 | 11 ppm |
| 0.1% $ER^1$ + $168^2$ + $1010^3$ + Tospearl | 78.83 | −0.76 | 5.32 | 11.16 | 16.7 | 10 ppm |
| 0.2% $ER^1$ + $168^2$ + $1010^3$ + Tospearl | 80.62 | −0.86 | 6.3 | 12.94 | 12.9 | 10 ppm |
| 0.5% $ER^1$ + $168^2$ + $1010^3$ + Tospearl | 78.23 | −1.98 | 9.87 | 19.66 | 21.7 | 16 ppm |

Additional color measurements are shown in Table 7 wherein 0.28 wt % $168^1$, 0.08 wt % $1010^2$ and 30 ppm Tospearl was added to each sample unless stated otherwise.

TABLE 7

Plaque Color Measurements Highlighting The Effect of Tospearl.

|  | L* | a* | b* | YIE | Haze | Si Content |
|---|---|---|---|---|---|---|
| Virgin L+ - Not compounded through extruder | 77.60 | −0.39 | 3.56 | 7.78 | 10.5 | 0 |
| L+ Control - Compounded through extruder | 78.99 | −0.27 | 4.03 | 8.81 | 11.2 | 0 |
| No Tospearl + 0.2% $ER^1$ + $168^2$ + $1010^3$ | 78.88 | −1.07 | 6.19 | 12.73 | 9.18 | 0 |
| Tospearl + $168^2$ + $1010^3$ + No $ER^1$ | 78.64 | −0.33 | 4.09 | 8.92 | 17.6 | 11 ppm |
| 40 ppm Tospearl + 0.2% $ER^1$ + $168^2$ + $1010^2$ | 80.62 | −0.86 | 6.3 | 12.94 | 12.9 | 10 ppm |
| 80 ppm Tospearl + 0.2% $ER^1$ + $168^2$ + $1010^3$ | 79.63 | −0.8 | 5.5 | 11.42 | 16.3 | 14 ppm |
| 130 Bead Tospearl + 0.2% $ER^1$ + $168^2$ + $1010^3$ | 79.19 | −1.06 | 6.96 | 14.33 | 18.1 | 9 ppm |
| 145 Bead Tospearl + 0.2% $ER^1$ + $168^2$ + $1010^3$ | 79.13 | −1.05 | 6.43 | 13.24 | 11.4 | 7 ppm |

Additional color measurements are shown in Table 8 wherein 0.28 wt % $168^2$, 0.08 wt % $1010^3$ and 30 ppm Tospearl was added to each sample unless stated otherwise.

TABLE 8

Colour comparison of thin film, thick sheet, bottles and thermoformed cups containing fatty acid amide/Tospearl variants versus control samples.

| Type | Sample | L* | a* | b* | YIE | Haze |
|---|---|---|---|---|---|---|
| Thin films | L+ Control | 88.97 | 0.06 | 4.21 | 8.63 | 0.99 |
|  | L+ + 50 ppm Tospearl | 89.40 | 0.06 | 4.19 | 8.55 | 1.90 |
|  | L+ + 210 ppm Tospearl | 88.98 | 0.06 | 4.19 | 8.57 | 2.26 |
| Thick film | L+ + 30 ppm Tospearl | 89.39 | 0.08 | 4.22 | 8.62 | 1.97 |
| Thin Sheets | L+ Control | 89.34 | 0.04 | 4.19 | 8.53 | 0.63 |
|  | L+ + 50 ppm Tospearl | 89.24 | 0.06 | 4.19 | 8.56 | 3.03 |
| Thick Sheet | L+ + 30 ppm Tospearl | 88.38 | −0.04 | 4.56 | 9.29 | 2.31 |
| 1 mm Plaques | L+ + 0.1% $ER^1$ + 30 ppm Tospearl + Stabilisers | 85.90 | −1.02 | 7.62 | 14.75 | 9.79 |
|  | L+ + 0.2% $ER^1$ + 30 ppm Tospearl + Stabilisers | 85.71 | −0.94 | 7.59 | 14.80 | 10.4 |
| 2L Bottles | L+ | 87.57 | −0.03 | 4.69 | 9.62 | 5.85 |
|  | L+ + 8 ppm Tospearl | 87.84 | 0.00 | 4.57 | 9.39 | 7.76 |
|  | L+ + 0.1% $ER^1$ + 30 ppm Tospearl | 87.58 | −0.03 | 4.62 | 9.47 | 5.75 |
| Thermoform Cups | L+ Control | 89.15 | 0.02 | 4.71 | 9.55 | 2.09 |
|  | L+ + Stiction additive package | 89.07 | 0.09 | 4.40 | 9.02 | 2.47 |

TABLE 9

Effect With and Without 168[2] on Plaque Color.
Degradation of plaques over time
L[+] used with and without 0.28 wt % Irgafos 168 but
including 0.2 wt % ER[1], 0.08 wt % Irganox 1010 and 30 ppm
120 bead Tospearl. The absence of Irgafos 168 in the
polymer is detrimental to color. The absence of
Irgaphos 168 results in the presence of hydroperoxides
which facilitate degradation

|  | L* | | a* | | b* | | YIE* | | Haze | |
| --- | --- | --- | --- | --- | --- | --- | --- | --- | --- | --- |
|  | +168 | −168 | +168 | −168 | +168 | −168 | +168 | −168 | +168 | −168 |
| 2 hrs drying | 78.40 | 79.54 | −1.45 | −2.03 | 5.79 | 8.24 | 11.60 | 16.06 | 18.7 | 20.2 |
| 3 hrs drying | 78.44 | 80.00 | −1.19 | −1.71 | 5.65 | 6.81 | 11.52 | 13.31 | 18.6 | 16.9 |
| 4 hrs drying | 79.95 | 79.09 | −1.40 | −1.53 | 6.67 | 6.49 | 13.31 | 12.92 | 18.7 | 17.7 |
| 5 hrs drying | 78.52 | 79.33 | −1.43 | −1.52 | 6.11 | 6.65 | 12.29 | 13.24 | 18.6 | 17.6 |

What is claimed is:

1. A method for reducing static friction effect between molded articles of PET homo- and co-polymers which comprising incorporating into the polymer, at any point before molding effective slip-promoting amounts of (i) a fatty acid amide selected from the group consisting of oleyl palmitamide, ethylene bis stearamide, ethylene bis oleomide, and stearyl erucamide; (ii) a partially or fully calcined porous poly(methylsilsequioxane); and (iii) a stabilizer comprising a primary and a secondary antioxidant wherein the primary and secondary antioxidant are present in a ratio of 1:4.

2. The method of claim 1 in which the primary antioxidant is tetrakis[methylene(3,5-ditert.butyl-4-hydroxy-hydrocinnamate)] methane, and the secondary antioxidant is (2,4-di-tert.butylphenyl)phosphite.

3. A method for producing a PET molded article having a reduced sticking effect which comprises at any point before molding the steps of (1) incorporating into the PET effective slip-promoting amounts of (i) a fatty acid amide selected from the group consisting of oleyl palmitamide, ethylene bis stearamide, ethylene bis oleomide, and stearyl erucamide; (ii) a partially or fully calcined porous poly(methylsilsequioxane); and (iii) a stabilizer comprising a primary and a secondary antioxidant wherein the primary and secondary antioxidant are present in a ratio of 1:4, and then (2) molding the polymer.

4. The method of claim 3 in which the primary antioxidant is tetrakis[methylene(3,5-ditert.butyl-4-hydroxy-hydrocinnamate)] methane, and the secondary antioxidant is (2,4-di-tert.butylphenyl)phosphite.

5. The method of claim 3 in which the fatty acid amide is stearyl erucamide at a concentration in the molded article of 0.2 wt%, the partially or fully calcined porous poly(methylsilsequioxane) is present in the molded article at a concentration of 30 ppm, the primary antioxidant is present in the molded article at a concentration of 0.28 wt%, and the secondary antioxidant is present in the molded article at a concentration of 0.08 wt%.

6. The method of claim 4 in which the fatty acid amide is stearyl erucamide at a concentration in the molded article of 0.2 wt%, the partially or fully calcined porous poly(methylsilsequioxane) is present in the molded article at a concentration of 30 ppm, the primary antioxidant is present in the molded article at a concentration of 0.28 wt%, and the secondary antioxidant is present in the molded article at a concentration of 0.08 wt %.

* * * * *